(12) United States Patent
Gencer et al.

(10) Patent No.: US 7,217,750 B2
(45) Date of Patent: *May 15, 2007

(54) PROCESS FOR INCORPORATING ONE OR MORE MATERIALS INTO A POLYMER COMPOSITION AND PRODUCTS PRODUCED THEREBY

(75) Inventors: Mehmet A. Gencer, Brecksville, OH (US); Sunggyu Lee, Columbia, MO (US); Abhay Sardesai, Columbia, MO (US); Donald A. Kubik, Dickenson, ND (US)

(73) Assignee: Northern Technologies International Corporation, Beachwood, OH (US)

( * ) Notice: Subject to any disclaimer, the term of this patent is extended or adjusted under 35 U.S.C. 154(b) by 576 days.

This patent is subject to a terminal disclaimer.

(21) Appl. No.: 10/347,661

(22) Filed: Jan. 20, 2003

(65) Prior Publication Data

US 2004/0143043 A1     Jul. 22, 2004

(51) Int. Cl.
*C08K 3/18* (2006.01)
*C08K 5/13* (2006.01)
*C08K 5/3475* (2006.01)
*C08G 73/10* (2006.01)

(52) U.S. Cl. .............. 524/91; 524/323; 524/334; 524/350; 524/424; 524/429

(58) Field of Classification Search ......... 524/429, 524/334, 350, 91, 323, 424
See application file for complete search history.

(56) References Cited

U.S. PATENT DOCUMENTS

| | | | |
|---|---|---|---|
| 2,581,907 A * | 1/1952 | Smith, Jr. et al. | 524/350 |
| 3,804,796 A | 4/1974 | Alexandre et al. | 260/42.43 |
| 4,441,886 A | 4/1984 | Muchmore et al. | 44/15 R |
| 4,491,526 A * | 1/1985 | Deck | 508/431 |
| 4,582,731 A | 4/1986 | Smith | 427/421 |
| 4,598,006 A | 7/1986 | Sand | 424/81 |
| 4,678,684 A | 7/1987 | Sand | 427/213.36 |
| 4,734,451 A | 3/1988 | Smith | 524/493 |
| 4,820,752 A | 4/1989 | Berens et al. | 523/340 |
| 4,992,308 A | 2/1991 | Sunol | 427/297 |
| 5,043,280 A | 8/1991 | Fischer et al. | 435/235.1 |
| 5,049,328 A | 9/1991 | Meyer et al. | 264/50 |
| 5,080,692 A | 1/1992 | Lee et al. | 44/624 |
| 5,094,892 A | 3/1992 | Kayihan | 427/440 |
| 5,128,382 A | 7/1992 | Elliott, Jr. et al. | 521/178 |
| 5,169,687 A | 12/1992 | Sunol | 427/297 |
| 5,233,021 A | 8/1993 | Sikorski | 528/491 |
| 5,252,620 A | 10/1993 | Elliott, Jr. et al. | 521/149 |
| 5,340,614 A * | 8/1994 | Perman et al. | 427/2.24 |
| 5,376,744 A | 12/1994 | Kennedy et al. | 526/89 |
| 5,386,055 A | 1/1995 | Lee et al. | 562/512.2 |
| 5,403,487 A | 4/1995 | Lodaya et al. | 210/610 |
| 5,508,060 A | 4/1996 | Perman et al. | 427/2.14 |
| 5,516,952 A | 5/1996 | Lee et al. | 585/241 |
| 5,663,237 A | 9/1997 | Lee et al. | 525/285 |
| 5,696,195 A | 12/1997 | Tuminello et al. | 524/419 |
| 5,766,637 A | 6/1998 | Shine et al. | 424/497 |
| 6,030,663 A | 2/2000 | McClain et al. | 427/389.9 |
| 6,123,984 A | 9/2000 | Fumio | 427/98 |
| 6,156,933 A | 12/2000 | Poliakoff et al. | 564/416 |
| 6,340,722 B1 | 1/2002 | Lee et al. | 524/428 |

OTHER PUBLICATIONS

Chemfinder.com, Sodium Nitrite description, Mar. 8, 2006, pp. 1-3.*
Chemfinder.com, Sodium Chloride description, Mar. 8, 2006, pp. 1-3.*

* cited by examiner

*Primary Examiner*—Kriellion Sanders
(74) *Attorney, Agent, or Firm*—Hudak, Shunk & Farine Co. LPA

(57) ABSTRACT

The present invention relates to various processes that utilize one or more supercritical fluids to disperse various inorganic and organic materials, including crystalline materials, into polymeric compositions, substrates or pre-formed articles without the utilization of melt processing of the polymeric compositions or exposing the various inorganic and organic materials and the polymers (or polymeric precursors) to a hot environment. The present invention also describes the unique properties that can be imparted to a polymer/resin composition or article once it has been subjected to a process according to the present invention versus those normally attributable to conventionally treated/processed polymer materials.

22 Claims, No Drawings

PROCESS FOR INCORPORATING ONE OR MORE MATERIALS INTO A POLYMER COMPOSITION AND PRODUCTS PRODUCED THEREBY

FIELD OF THE INVENTION

The present invention relates to various processes that utilize one or more supercritical fluids to disperse various inorganic and organic materials, including crystalline materials, into polymeric compositions, substrates or pre-formed articles without the utilization of melt processing of the polymeric compositions or exposing the various inorganic and organic materials and the polymers (or polymeric precursors) to a high temperature environment under which material decomposition may occur. The present invention also describes the unique properties that can be imparted to a polymer composition or article once it has been subjected to a process according to the present invention versus those normally attributable to conventionally treated/processed polymeric materials.

BACKGROUND OF THE INVENTION

Various compounding ingredients conventionally are added to rubber or polymer compositions to enhance the physical and/or chemical properties of the compositions. Additives commonly added to rubber or polymer compositions include antioxidants, vulcanizing agents, accelerators, accelerator activators, plasticizers, softeners, tackifiers and extenders. In some cases it may be desirable to add other additives such as fillers, colorants, slip agents, lubricants, anti-bacterials, anti-statics, anti-corrosives (e.g., volatile corrosion inhibitors), anti-mildew agents, anti-settling agents, UV-protectants, insecticides, pesticides, oils (including biodegradable oils), etc., to a rubber or polymer composition.

In most instances to date, an additive or additives are combined with the rubber or polymer composition by mixing the rubber or polymer composition (or polymer composition pre-cursor) with the additive or additives together on a roll mill, in an internal mixer (such as a Banbury mixer) or within an extruder. During the mixing process, the rubber or polymer composition is masticated to convert the rubber or polymer composition into a more pliable form. With many polymers, the mastication of the polymer per se generates sufficient heat to cause the temperature of the mix to rise substantially. The increased temperature of the polymer causes the mix to become more pliable and permits the compounding ingredients to be more easily dispersed throughout the polymer. With some polymers, however, external heat is necessary to impart to the polymer the desired degree of plasticity. However, the temperature rise of the composition achieved during the mechanical mixing process or because of externally applied heat can be detrimental to some polymers. Such a temperature rise could cause degradation at temperatures realized during the mechanical mixing operation. Additionally, some additives cannot withstand the temperatures reached during the mechanical mixing procedure. For example, when incorporating various additives into polyvinyl chloride (PVC), the PVC often is heated to temperatures of up to about 180° C. to about 200° C. to cause the PVC to form a pliable plastic mass into which the additives can readily be incorporated. At such temperatures, the PVC commences to rapidly degrade. Even certain additives which might be considered desirable for use in PVC compositions cannot be used since at the processing temperatures achieved such additives would decompose or be otherwise objectionably affected. Many potential additives for rubber compositions also would be adversely affected by the temperatures reached during mixing of the composition on roll mills, in an internal mixer or in an extruder. Some ultra-fast accelerators, if added to a rubber batch being mixed on roll mills, in an internal mixer or in an extruder, would cause the rubber batch to "scorch" (pre-cure) during the mixing operation if the temperature of the rubber batch becomes too high.

U.S. Pat. No. 3,969,196 describes the separation of one organic compound from another using a supercritical fluid. In practicing the process, a supercritical fluid is placed in contact with a mixture of liquids and/or solids during which period one of the components in the mixture is dissolved in the supercritical fluid. The dissolved component is removed from the supercritical fluid by reducing the pressure of the supercritical fluid "solvent."

U.S. Pat. No. 4,061,566 describes removing organic adsorbates which have been entrapped by a polymeric adsorbent using a supercritical fluid as an inert solvent for the adsorbate. The spent polymeric adsorbent, with the adsorbate adhered to it, is exposed to a supercritical fluid that is a solvent for the adsorbate to cause the adsorbate to become dissolved in the supercritical fluid stream, thereby rejuvenating the adsorbent and rendering it capable of adsorbing more adsorbate. The adsorbate dissolved in the supercritical fluid is separated from the supercritical fluid solvent by reducing the temperature and/or pressure of the supercritical fluid to a subcritical state (to change the fluid from being a solvent for the adsorbate to being a non-solvent for the adsorbate) or by reacting the adsorbate with another material added to the supercritical fluid to form a compound readily separated from the fluid.

U.S. Pat. No. 4,250,331 pertains to an extraction process for recovering organic carboxylic acids from aqueous solutions of salts of the carboxylic acids. In utilizing the process, the aqueous solution is contacted with carbon dioxide in a supercritical state. The carbon dioxide reacts with the salt of the organic carboxylic acid in the solution to produce carboxylic acid which dissolves in the supercritical fluid. The supercritical fluid phase is separated from the aqueous phase. The pressure of the supercritical fluid is reduced which significantly reduces the solvent capabilities of the carbon dioxide, resulting in the carboxylic acid separating from the carbon dioxide. The carboxylic acid is removed from the carbon dioxide which can be re-pressurized and re-used.

A process for recovering tall oil and turpentine or their components is described in U.S. Pat. No. 4,308,200. The process involves contacting wood chips to be extracted with a fluid at supercritical conditions, the fluid being selected so that at supercritical conditions the fluid is a solvent for the components in the wood desired to be extracted. The supercritical fluid is maintained in contact with the wood chips until the desired degree of extraction is achieved. The tall oil and turpentine are retrieved from the supercritical fluid by reduction of the pressure of the fluid phase. By step-down reduction of the pressure, the various components of the tall oil and turpentine can be retrieved as separate fractions.

In addition to the extraction processes mentioned above, supercritical fluid extraction has been used for: removal of caffeine from coffee and tea; removal of nicotine from tobacco; deodorization of oils and fats; removal of vegetable oils and fats from seeds; de-asphalting petroleum fractions; removal of lanolin from wool; oil removal from potato chips; removal of monomer from polymer; removal of α-acids from hops; extraction of flavors and fragrances from lilac, lemon peel, black pepper, almonds, nutmeg, ground chilies, etc.; and extraction of oils, such as triglycerides, from soybean flake and corn germ. The aforesaid uses of supercritical fluids all concern extraction of a component from a complex matrix.

U.S. Pat. No. 4,112,151 describes a process for filling the pores of a resilient open-cell porous material with a pressure expressible material. The process can be used for filling the interconnecting cells of a resilient microporous rubber ink pad with ink. The process involves soaking the open-cell resilient material in a mixture of (a) a volatile solvent swelling agent for the resilient polymer and (b) the pressure expressible material. The volatile swelling agent swells the polymer material enlarging the interconnecting pores (cells) of the microporous material. The solvent/ink mixture then is able to enter and fill the enlarged pores (cells) of the microporous material. The volatile swelling agent then is allowed to evaporate from the microporous material leaving the pressure expressible material contained within the open cells of the microporous polymer.

U.S. Pat. No. 4,820,752 pertains to a process for infusing an organic additive into a polymer using a compressed fluid that is normally a gas at room temperature and pressure. The organic additive must have some degree of solubility in the compressed fluid and the solution of compressed fluid and organic additive must have some degree of solubility in the polymer. In accordance with the process, the solution of the normally gaseous fluid and organic additive and the polymer are brought into contact under pressure until a desired quantity of the solution is absorbed into the polymer. The compressed fluid then is diffused from the polymer leaving organic additive infused within the polymer.

Therefore, a process for incorporating additives into polymers that achieve uniform deep penetration of an additive into a polymer film or object without subjecting the polymer or additive to the relatively high temperatures encountered during mechanical mixing procedures would be extremely useful. Additionally, a process for incorporating one or more additives into a previously formed or "pre-formed" polymer film or object would be useful.

SUMMARY OF THE INVENTION

The present invention relates to various processes that utilize one or more supercritical fluids to disperse various inorganic and organic materials, including crystalline materials, into polymeric compositions, substrates or pre-formed articles without the utilization of melt processing of the polymeric compositions or exposing the various inorganic and organic materials and the polymers (or polymeric precursors) to a high temperature environment. The present invention also describes the unique properties that can be imparted to a polymer composition or article once it has been subjected to a process according to the present invention versus those normally attributable to conventionally treated/processed polymer materials. Additionally, it should be noted that in the following text, range and/or ratio limits may be combined.

In accordance with one aspect of the invention, a process for infusing at least one additive into a polymer or resin material comprises the steps of: (A) dissolving at least one additive in a supercritical fluid; (B) contacting the supercritical fluid containing the at least one additive with the polymer or resin material, wherein the at least one additive comprises at least one corrosion inhibitor; and (C) separating at least essentially all of the supercritical fluid from the polymer or resin material leaving the at least one additive infused in the polymer or resin material.

In accordance with another aspect of the invention, a process for infusing at least one additive into a polymer or resin material comprises the steps of: (A) preparing a supercritical fluid or supercritical fluid system that contains at least two components; (B) simultaneously contacting with the supercritical fluid or supercritical fluid system at least one additive to be infused in at least one polymer or resin material; and (C) separating at least essentially all of the supercritical fluid or supercritical fluid system from the polymer or resin material leaving the at least one additive infused in the polymer or resin material.

To the accomplishment of the foregoing and related ends, the invention, then, comprises the features hereinafter fully described and particularly pointed out in the claims. These embodiments are indicative, however, of but a few of the various ways in which the principles of the invention may be employed. Other objects, advantages and features of the invention will become apparent from the following detailed description of the invention.

DETAILED DESCRIPTION OF THE INVENTION

The present invention relates to various processes that utilize one or more supercritical fluids to disperse various inorganic and organic materials, including crystalline materials, into polymeric compositions, substrates or pre-formed articles without the utilization of melt processing of the polymeric compositions or exposing the various inorganic and organic materials and the polymers (or polymeric precursors) to a hot environment. The present invention also describes the unique properties that can be imparted to a polymer/resin composition or article once it has been subjected to a process according to the present invention versus those normally attributable to conventionally treated/processed polymer materials. Additionally, it should be noted that in the following text, range and/or ratio limits may be combined.

As used herein, the term "supercritical fluid" refers to a fluid (this term is hereby defined to include compounds which are either a gas or liquid at room temperature (25° C.) and pressure (1 atmosphere (1 atm)) which has been subjected to the necessary combination of pressure and temperature, both of which are higher than the critical pressure and critical temperature of the fluid, to yield a supercritical fluid. It is known that all fluids possess a critical temperature ($T_c$), above which a gaseous fluid cannot be converted to a liquid regardless of the pressure exerted on the gaseous fluid. In general, the solvent power of a given fluid increases as the density of the fluid increases. A fluid may have sufficient solvent or swelling power to be useful in practicing the present invention if sufficiently compressed at temperatures above or equal to the critical temperature of the fluid.

Above the critical temperature and pressure of a fluid or gas (including mixtures thereof), the fluid or gas is in its supercritical state. At or below the critical temperature/pressure of a fluid or gas, the fluid or gas may be in a liquid or gaseous state, respectively. The additive to be infused into a polymer or polymer article can, in one embodiment, have some solubility in the supercritical fluid being used. Further, the solution of supercritical fluid and additive can, in one embodiment, have some degree of solubility in the polymer or polymer article being infused and should be capable of swelling the polymer.

Polymeric materials soften, swell or dissolve when subjected to the supercritical fluid environment. The fluids for supercritical processing include, but are not limited to, carbon dioxide, nitrous oxide, propane, acetone, isopropanol, ethanol, benzene, toluene, water, methanol and hexane. In another embodiment, a binary supercritical fluid system composed of two compatible fluids can be used. By compatible it is meant that the two fluids are homogeneously miscible at a supercritical condition of the mixture. For instance, if a binary system is chosen with carbon dioxide and a companion fluid, the concentration of the companion fluid is typically kept low, in the about 0.1 percent by weight to about 50 percent by weight range, or in the about 0.5 percent by weight to about 40 percent by weight range, or in the about 1 percent by weight to about 30 percent by weight range, or in the about 2 percent by weight to about 20 percent by weight range, or even in the about 3 percent by weight to about 10 percent by weight range.

In yet another embodiment, a ternary supercritical system can be utilized in the present invention. In such a system, all three fluids to be utilized in the ternary system should be homogeneously miscible at a supercritical condition for the mixture. Examples of ternary systems include, but are not limited to, carbon dioxide/ethanol/water, carbon dioxide/acetone/water and carbon dioxide/acetone/ethanol.

The supercritical properties of a variety of compounds are shown below in Table 1

TABLE 1

| Fluid | Critical Temperature (° C.) | Critical Pressure (atm) |
| --- | --- | --- |
| Carbon Dioxide | 31.4 | 73.4 |
| Nitrous Oxide | 36.5 | 71.5 |
| Acetone | 234.9 | 46.4 |
| Isopropanol | 235.2 | 47.0 |
| Ethanol | 240.8 | 62.2 |
| Benzene | 289.0 | 48.3 |
| Toluene | 318.6 | 40.6 |
| Water | 374.2 | 217.6 |

As an example, carbon dioxide has a critical temperature of 31.4° C. and a critical pressure of 73.4 atm. Due to its low critical temperature, its use as a supercritical fluid has been popular. As discussed above, most of the applications of supercritical fluids and, in particular, carbon dioxide, have been in the fields of extraction and reaction medium. There has been no attempt in utilizing the supercritical fluid in processing volatile inorganic compounds, alkaline metal salts or electrolyte crystals.

There have been little or no processing efforts that directly involve films or pre-formed polymeric articles (or objects) in a supercritical fluid medium, especially for adding specialty functions to these materials. Furthermore, processing efforts that have been made have not been successful in dispersing inorganic salt compounds and/or materials uniformly and with deep penetration into a polymeric system, resin or pre-formed article, plasticized or unplasticized, based on supercritical fluid processing. Due to the low temperature processing that can be achieved using a supercritical fluid, it has been discovered that various additives, including volatile inorganic compounds (e.g., vapor-phase or volatile corrosion inhibitors), alkaline metal salts or electrolyte crystals can be infused into a polymer system, polymer pre-cursor or pre-formed polymer article without adversely affecting the chemical, physical, mechanical and Theological properties of the polymer system, polymer pre-cursor or pre-formed polymer article. For example, the present process permits infusion of various compounds into a polymeric system, resin and/or pre-formed article without causing the obstruction of any natural pathways, if present, which pass through and/or exist in the polymeric system, resin and/or pre-formed article. This in turn allows for the infusion of compounds into a polymeric system, resin and/or pre-formed article which can or may impart a specialty function thereto (e.g., volatile corrosion inhibition, antioxidation properties, etc.).

In supercritical processing, swelling of a polymer can be viewed as dissolution of the fluid phase (supercritical fluid) into the polymeric medium, and as such this phenomenon is quite useful for infusion of one or more additives. Softening is more or less viewed as a mechanical property change that allows for encapsulation of inhomogeneous ingredients in the polymer matrices. Dissolution is a phenomenon that can result in homogeneous mixing and interdiffusion of the material between the substrate and diffusant.

When utilizing a single compound system, the present process functions as intended so long as the compound to be utilized as the supercritical fluid is kept above both its supercritical temperature and pressure. When a mixture of compounds is to be utilized as a supercritical fluid (i.e., a binary or ternary system), the supercritical temperature and pressure which need to be exceeded will deviate from those stated in Table 1 for single compounds. One of ordinary skill in the art, knowing the make up of such systems, can readily determine the supercritical temperature and pressure which must be exceeded in order to yield the desired supercritical fluid.

In one embodiment, the pressure at which the present process is conducted far exceeds the supercritical pressure of the supercritical fluid (whether a single, binary or ternary supercritical fluid). In one embodiment, depending upon the makeup of the supercritical fluid being utilized, the pressure at which the present invention is conducted is in the range of about 60 atm to about 750 atm, or in the range of about 70 atm to about 300 atm, or even in the range of about 90 atm to about 225 atm. It should be noted that both the temperature and pressure at which the present process is conducted must exceed the supercritical temperature and pressure of the fluid to be utilized therein.

The polymer or polymer article into which one or more additives are to be infused using the process of the present invention may be or may be formed from any rubber or polymer capable of being swollen by at least about 2 percent by volume, or by at least about 5 percent by volume, or even by at least about 7 percent by volume by the supercritical fluid being utilized in the present invention. Such polymers include natural rubbers, polyisoprene polymers, styrene-butadiene polymers, butyl rubbers, chloroprene polymers, polyamides, polyimides, polyesters, nitrile rubbers, polyacrylic polymers, polystyrene polymers, fluoro polymers (e.g., polytetrafluoro ethylene or polyvinylidene fluoride), vinyl chloride polymers, vinylidene chloride polymers, polycarbonate polymers, polyurethane polymers, polyacetylenes and polyolefins. In another embodiment, the present invention can also be utilized to infuse one or more additives into a precursor or resin used to form the above-listed polymer compositions. In still another embodiment, the present invention can be utilized to infuse one or more additives into a pre-formed polymer article that is made or composed of one or more of the above-listed polymers. The one or more additives to be infused into the polymer/resin composition and/or pre-formed polymer article do not need to be soluble in the polymer/resin composition and/or polymer article.

In still another embodiment, the present invention can be utilized to infuse one or more additives into a biodegradable polymer, biodegradable polymer precursor or resin or a pre-formed biodegradable polymer article. Any polymer which exhibits biodegradability can be utilized in conjunction with the present invention. Examples of suitable biodegradable polymers include, but are not limited to, biodegradable polyesters (e.g., linear poly ε-caprolactone (PCL)), biodegradable polylactic acid polymers, biodegradable polyester amide polymers, biodegradable polyester urethane polymers and biodegradable copolymers of any combination of two or more of the above. Such copolymers may include two or more of the same type of polymer, for example, two or more different biodegradable polyesters.

In still another embodiment, the one or more additives which may be infused into a particular polymer may have some degree of solubility in the swollen polymer, at least about 0.1 percent by weight, and normally will be a solid or liquid. Such additives include antioxidants, accelerators, accelerator activators, plasticizers, softeners, vulcanizing agents, extenders, tackifiers, monomers, polymerization initiators, UV stabilizers, UV sensitizers, dyes (colorants), fillers, slip agents, lubricants, anti-bacterials, anti-statics, anti-mildew agents, anti-settling agents, insecticides, pesticides, corrosion inhibitors, oils or mixtures of two or more thereof.

In another embodiment, any desired liquid or solid material can be incorporated into a polymer/resin composition and/or pre-formed polymer article, regardless of the desired liquid or solid material's solubility or non-solubility in the polymer/resin composition and/or pre-formed polymer article. This is true so long as the material has a molecular size sufficiently small to allow it to be incorporated into the swollen polymer/resin composition and/or pre-formed polymer article and the material is at least somewhat soluble in the supercritical fluid being used to incorporate the desired material into the polymer/resin composition and/or pre-formed polymer article. In one embodiment, the material to be incorporated into the polymer/resin composition and/or pre-formed polymer article has a solubility of from about 0.1 percent by weight to about 20 percent by weight in the supercritical fluid being utilized to accomplish the incorporation. In another embodiment, the material to be incorporated into the polymer/resin composition and/or pre-formed polymer article has a solubility of from about 0.2 percent by weight to about 15 percent by weight, or from about 0.3 percent by weight to about 10 percent by weight, or even from about 0.5 percent by weight to about 5 percent by weight in the supercritical fluid being utilized to accomplish the incorporation.

With regard to the particle size of the material to be incorporated into the desired polymer/resin composition and/or pre-formed polymer article, any particle size will suffice so long as the material to be incorporated is soluble (i.e., has a solubility of at about least 0.5 percent by weight, or at least about 1 percent by weight, or even at least 3 percent by weight) in the supercritical fluid being utilized in the present process. In the case where the material to be incorporated has a solubility of less than about 0.5 percent by weight in the supercritical fluid being utilized, then the particle size of the material to be incorporated is in the range of about 4 Tyler mesh to about 250 Tyler mesh, or from about 8 Tyler mesh to about 200 Tyler mesh, or from about 12 Tyler mesh to about 150 Tyler mesh, or from about 16 Tyler mesh to about 100 Tyler mesh, or from about 20 Tyler mesh to about 75 Tyler mesh, or even from about 35 Tyler mesh to about 60 Tyler mesh. In another embodiment, the particle size of the material to be incorporated is in the range of about 8 Tyler mesh to about 115 Tyler mesh.

While not wishing to be bound to any one theory, it is believed that the desired material is incorporated homogeneously into the matrix of the polymer/resin composition and/or pre-formed polymer article via swelling of the polymer/resin composition and/or pre-formed polymer article accomplished by the impregnated supercritical fluid (i.e., a supercritical fluid which contains one or more additives). After this swelling has occurred, the impregnated supercritical fluid can diffuse into the matrix of the polymer/resin composition and/or pre-formed polymer article thereby carrying the one or more additives or materials contained within the impregnated supercritical fluid into the polymer/resin composition's and/or pre-formed polymer article's polymer matrix.

In one instance, the present invention permits at least about 0.01 weight percent of one or more additives to be infused into a desired polymer system, polymer pre-cursor or pre-formed polymer article. In another embodiment, the amount of additive(s) infused into a polymer system, polymer pre-cursor or pre-formed polymer article is in the range of about 0.01 weight percent to about 40 weight percent, or from about 0.1 weight percent to about 30 weight percent, or even from about 1 weight percent to about 25 weight percent.

Volatile Corrosion Inhibitors:

As noted above, the one or more additives which may be infused into a polymer system, polymer pre-cursor or pre-formed polymer article can include any suitable volatile corrosion inhibitor (or vapor phase corrosion inhibitor). Some suitable volatile corrosion inhibitors are disclosed in U.S. Pat. Nos. 4,290,912; 5,320,778 and 5,855,975, which are all incorporated herein by reference in their entirety for their teachings of such compounds. For example, useful vapor phase or volatile corrosion inhibitors include, but are not limited to, triazoles and/or inorganic nitrites (e.g., nitrite salts).

In one embodiment, exemplary inorganic nitrite salts include, but are not limited to, metal nitrites, such as, sodium nitrite, potassium nitrite and barium nitrite. In another embodiment, any suitable Group 1 or Group 2 nitrite (New Notation System) can be used in the present invention.

In another embodiment, the one or more vapor phase or volatile corrosion inhibitors utilized in the present invention can be a triazole. Exemplary triazoles include, but are not limited to, benzotriazole, tolyltriazole and/or sodium tolyltriazole.

In yet another embodiment, the vapor phase or volatile corrosion inhibitor utilized in the present invention can be any suitable mixture of two or more of the above-mentioned inhibitors.

Antioxidants:

As noted above, the one or more additives which may be infused into a polymer system, polymer pre-cursor or pre-formed polymer article can include any suitable antioxidant. Exemplary antioxidants include, but are not limited to, tri-substituted phenols substituted in the 2, 4 and 6 positions with one or more alkyl, hydroxyalkyl, aryl, alkenyl or hydroxyalkenyl groups of the general formula shown below.

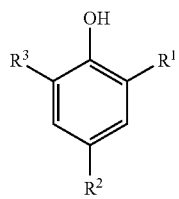

In one embodiment, the sum of the carbon atoms present in the substituent groups $R^1$, $R^2$ and $R^3$ is in the range of 3 to about 36, or even in the range of 3 to about 18.

In another embodiment, a mixture of two or more of the above-mentioned antioxidants can be utilized in the present invention.

Exemplary Embodiments:

The present invention will now be discussed in relation to certain exemplary embodiments. However, the present invention is not limited thereto.

Polymer films, such as polyvinyl chloride and polyethylene films, can be treated with an inorganic salt, such as, sodium nitrite in a supercritical fluid. Due to the process of the present invention, the resultant film (or pre-formed polymer article) contains an uniform distribution of the inorganic salt in the polymer matrix with a penetration throughout the thickness of the film or article. The weight percent of the inorganic material diffused into the film can be varied between about 0.01 and about 40, or between about 0.1 and about 30, or between about 1 and about 25, or between about 3 and about 20. The percentage of diffusant salt depends on the type of polymer, type of fluid adopted, temperature of the process, pressure of the system, crystal size of the salt (the additive to be infused), type of the salt, presence or absence of additional supercritical fluids (i.e., a binary or ternary system) and time of processing treatment.

The process of the present invention is advantageous in that it can be carried out at temperatures below the glass transition temperatures (Tg) and/or melt temperatures (Tm) of various polymer/resin compositions, as long as the fluid or fluid mixture stays above its critical conditions. For example, in the case of carbon dioxide supercritical fluid conditions, the process can be carried out barely above the carbon dioxide's critical temperature of 31.4° C. so long as the pressure utilized for the process is above carbon dioxide's critical pressure (73.4 atm).

Due in part to the temperature utilized in the process of the present invention, polymeric materials can be processed without going through any structural degradation, such as pyrolytic decomposition or crosslinking restructuring. There is no need of any melt processing equipment to complete the interdiffusion process of the present invention. Thus, the process of the present invention accomplishes interdiffusion of inorganic salts with no or minimal exposure of the treated materials to heat and the resultant materials possess the unique property of controlled-release diffusion of the diffusant without any sacrifice of the original material properties. Furthermore, as is noted above, the process of the present invention is applicable to either finished and pre-formed articles or raw material type resins.

Once the supercritical diffusion process of the present invention is applied to a raw material polymeric resin, it can be considered a low-temperature compounding process that can also incorporate other ingredients into the master batch of polymer compounding still under the very same supercritical fluid conditions. In such cases, there is no melt processing involved and as such no precuring or fusing of the compounded materials.

Due to the nature of low temperature interdiffusion and dissolution process, the treated polymer materials possess reversibility, which is not entirely possible with other thermal treatment processes. In other words, the inorganic salts that are imparted and diffused into the polymeric layer can diffuse out into the atmosphere in a slow natural process. While not wishing to be bound to any one theory, this benefit is believed to be obtained due to the complete absence of thermal annealing or interpenetrating polymer network (IPN) in the supercritically treated polymeric material. Thus, the resultant polymeric product has a controlled release property in terms of diffusant release into the surrounding atmosphere. This is especially true when the diffusant has a non-trivial volatility, for example, in the case of volatile or vapor phase corrosion inhibitors.

The supercritical interdiffusion process of the present invention can be applied repeatedly without ruining or damaging the polymer system, polymer pre-cursor or pre-formed polymer article to be treated. This not only establishes the total reversibility of the process, but also enhances the value of the treated materials by extending the usable service life. Fast charging with volatile inorganic salts in polymeric articles is considered a manufacturing step, while slow diffusion of volatile inorganic salts out of the polymer system is regarded as an application step by consumers. Once the product, after a predetermined service life, loses a certain predetermined amount of volatile inorganic salt, the polymeric article can be re-subjected to the process treatment thereby making the product fully recharged with the salts. This is easily feasible due to the nature of low temperature processing conditions, as well as the total reversibility of the process without occurrence of damaging chemical reactions in the system.

The process of the present invention can also be applied to the case where organic salts or organic crystals, instead of inorganic salts, are to be dispersed. Examples of such organic salts or organic crystals include, but are not limited to, acetates, palmitates, fatty acid esters and maleates. Due to the low temperature processing well below the melting points of such salts or crystals, this process can be applied to diffuse such organic salts or crystals into polymeric matrices without inducing any grafting reactions, crosslinking problems or ionomer formations. Specialty functions, such as in-situ lubricating properties and corrosion inhibition, can be added.

Certain crystalline materials that are used for this process show extraordinary solubility into the supercritical carbon dioxide or binary/ternary supercritical fluids based in part on carbon dioxide. Such materials include, but are not limited to, sodium nitrite, sodium nitrate, potassium nitrite, potassium nitrate, sodium phosphate, potassium phosphate, calcium phosphate, magnesium chloride, zinc carbonate and zinc oxide. This fact can be exploited when designing a process treatment system for carrying out the present invention, thereby allowing a double stage processing by which crystalline substances do not have to be placed in the same treatment vessel with polymeric materials. Such a process is explained in greater detail below.

Even though the current examples were derived from the use of supercritical carbon dioxide, the present invention is equally applicable to other supercritical solvents including, for example, nitrous oxide, propane, acetone, isopropanol, ethanol, benzene, toluene, water, methanol and hexane, or even binary/ternary fluids as discussed above. Further, the current invention is also applicable to the use of co-solvent supercritical systems, such as $CO_2$-ethanol, $CO_2$-acetone, etc.

As noted above, the process of the present invention can be applied to raw material resins as well as finished polymeric articles and/or objects. In the case of resin treatment, the treated polymeric resins yielded by the present invention will then have to be subjected to further processing, as is known in the art, to yield final objects and articles. In this instance, an exemplary process scheme is as follows:

Step 1: Supercritical diffusion of one or more additives into a polymeric resin;

Step 2: Concurrent compounding in the supercritical fluid; and

Step 3: Further process of the resulting infused or interdiffused polymeric resin, by known techniques, to yield the desired final product(s).

As would be apparent to one of skill in the art, Step 1 should be conducted at a temperature and pressure sufficient to maintain the supercriticality of the system being utilized.

The process of the present invention can be carried out either in a single stage or in a double stage. In a single stage mode, both polymeric articles and diffusants are placed in the same treatment vessel and a predetermined amount of supercritical fluid is introduced into the system for treatment. This process can be handled either in a batch mode or in a continuous mode. In this instance, an exemplary process scheme is as follows:

Step 1: Introduction of supercritical fluid at controlled temperature and pressure; and Step 2: Single-stage contacting of polymer, polymer article, or resin and the one or more additives to be diffused or infused therein with the supercritical fluid.

In a double stage mode, the first step is the solubilizing in the supercritical fluid of the additive to be diffused or infused. The second step serves as an interdiffusion treatment step in which the polymer, polymer article or resin is subjected to interdiffusion. The double stage process is possible when the additive to be diffused or infused into a polymer, polymer article or resin is soluble in the supercritical fluid being utilized. In this instance, an exemplary process scheme is as follows:

Step 1: Introduction of supercritical fluid at controlled temperature and pressure;

Step 2: Introduction of one or more additives into the supercritical fluid; and

Step 3: Diffusion or infusion of one or more additives into polymer, polymer article or resin.

In one embodiment, no matter which of the above processes is utilized, a polymer, polymer article or resin is exposed to (e.g., by direct contact to or with) a supercritical fluid which contains (due to either previous or simultaneous addition) one or more additives to be infused or diffused into the polymer, polymer article or resin for a period of about 1 minute to about 3 hours, or about 10 minutes to about 2 hours, or even about 30 minutes to about 1.5 hours. The temperature and pressure at which the process of the present invention is conducted will vary according to the compound or compounds utilized as the supercritical fluid. In another embodiment, the resin and/or polymer and one or more additives to be infused therein can be exposed simultaneously to a supercritical fluid.

As an example, two rectangular pieces of polyethylene (PE) films measuring 4.5 by 2.5 by 0.0039 inches, which are weighed beforehand, are coiled and placed in a supercritical reactor. In addition, a circular piece of polyethylene tubing having a diameter of 1.75 inches and a thickness of 0.0039 inches, which is weighed beforehand, is placed into the same reactor with the above-mentioned PE films. These three items are then exposed to a supercritical fluid of $CO_2$ which contains therein $NaNO_2$ at a temperature of 50° C. and a pressure of 176.9 atm (2600 psi) for about 30 minutes.

After 30 minutes, the items are removed and weighed again. The two rectangular films of PE show a weight gain which correlates to an infusion rate of 9.38 weight percent and 10.87 weight percent, respectively. The PE tubing shows a weight gain which correlates to an infusion rate of 6.64 weight percent.

As can be seen from Tables 2 to 4 below, as the time, temperature or pressure at which the infusion or diffusion process is conducted varies, so does the amount of additive incorporated into the polymer. For the results listed in Tables 2 to 4, PE pellets having a diameter of approximately 0.2 inches were utilized with $CO_2$ as the supercritical fluid and $NaNO_2$ as the additive.

TABLE 2

| Pressure (atm/psi) | Weight Percent Increase |
| --- | --- |
| 163.3 atm (2400 psi) | 3.06 |
| 204.1 atm (3000 psi) | 8.50 |

In both of the above instances, the temperature is set to be 50° C., and the time of the infusion process is 30 minutes.

TABLE 3

| Time (hr) | Weight Percent Increase |
| --- | --- |
| 0.5 | 3.06 |
| 1.0 | 8.50 |
| 3.0 | 14.84 |

In all of the above instances, the temperature is set to be 50° C., and the pressure is set at 163.3 atm (2400 psi).

TABLE 4

| Temperature (° C.) | Weight Percent Increase |
| --- | --- |
| 40 | 5.26 |
| 50 | 3.06 |
| 60 | 4.46 |

In all of the above instances, the pressure is set to be 2400 psi, and the time of the infusion process is 30 minutes.

Given the above results, it can be shown that sodium nitrite has an unexpectedly high solubility in supercritical carbon dioxide. Additionally, the same results hold true for binary or ternary supercritical fluids which are utilized in the present invention that include carbon dioxide as a main ingredient (systems having at least about 50.1 percent by weight carbon dioxide, or even at least about 51 percent by weight carbon dioxide). As noted above, the compounds which can be partnered with carbon dioxide should be compatible with carbon dioxide in a condensed phase, compatible with the diffusant types used, and synergistically beneficial to the process objectives. Typical candidates include, but are not limited to, acetone, ethanol, methanol, hexane and water. Adding one or more additional compounds to create a binary or ternary supercritical fluid changes the critical points of the resultant mixtures as well as affects the process economics. Therefore, the concentration of any such additional compounds present should be kept low enough to maintain a critical temperature for the supercritical fluid mixture which is well below the Tg or Tm of the polymer or resin being subjected to infusion or diffusion. In one embodiment, the amount of any additional compound which is added to yield a binary or ternary supercritical fluid should be in the range of about 0.1 to about 20 weight percent based upon the amount of main supercritical compound chosen (e.g., $CO_2$). The above considerations are also important from the standpoint of process economics.

Although the invention has been shown and described with respect to certain embodiments, it is obvious that equivalent alterations and modifications will occur to others skilled in the art upon the reading and understanding of this specification. In particular with regard to the various functions performed by the above described components, the terms (including any reference to a "means") used to describe such components are intended to correspond, unless otherwise indicated, to any component which performs the specified function of the described component (e.g., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired and advantageous for any given or particular application.

What is claimed is:

1. A process for infusing at least one corrosion inhibitor into a biodegradable polymer, a polymer, or resin material, comprising the steps of:
   providing a supercritical fluid comprising carbon dioxide or nitrous oxide;
   contacting a) said biodegradable polymer, said polymer, or said resin and b) at least one triazole or inorganic nitrite corrosion inhibitor with said supercritical fluid under supercritical conditions, wherein a) said biodegradable polymer, said polymer, or said resin is contacted with said supercritical fluid before, after, or simultaneously with said contacting of said b) at least one triazole or inorganic nitrite corrosion inhibitor with said supercritical fluid; and
   separating at least essentially all of the supercritical fluid from said biodegradable polymer, said polymer, or said resin material leaving said at least one triazole or inorganic nitrite corrosion inhibitor infused in the biodegradable polymer, polymer, or resin material.

2. The process of claim 1, wherein said at least one triazole corrosion inhibitor is benzotriazole, tolyltriazole, sodium tolytriazole, or mixtures of two or more thereof, and wherein said inorganic nitrite is a Group 1 nitrite, a Group 2 nitrite, or mixtures of two or more thereof.

3. The process of claim 2, wherein said polymer or resin material comprises natural rubber, polyisoprene, styrene-butadiene polymer, butyl rubber, chloroprene polymer, polyamide, polyimide, polyester, nitrile rubber, polyacrylic, polystyrene, fluoro polymer, vinyl chloride polymer, polycarbonate, polyurethane, polyacetylene, or polyolefin, or combinations thereof, wherein said biodegradable polymer comprises a biodegradable polymer precursor or resin, a biodegradable polyester, a biodegradable polylactic acid polymer, a biodegradable polyester amide polymer, or a biodegradable polyester urethane polymer, or a copolymer of any two or more of said biodegradable polymers.

4. The process of claim 3, wherein said at least one corrosion inhibitor is said inorganic nitrite, wherein said inorganic nitrite is sodium nitrite, potassium nitrite, or barium nitrite, or mixtures of two or more thereof.

5. The process of claim 1, further including contacting at least one additive with said supercritical fluid, said additive comprising an antioxidant, accelerator, accelerator activator, plasticizer, softener, vulcanizing agent, extender, tackifier, monomer, polymerization initiator, UV stabilizer, UV sensitizer, dye, filler, slip agent, lubricant, anti-bacterial, anti-static, anti-mildew agent, anti-settling agent, insecticide, pesticide, corrosion inhibitor, oil, or mixtures of two or more thereof.

6. The process of claim 1, further including contacting at least one antioxidant with said supercritical fluid, said antioxidant being infused into the polymer or resin material.

7. The process of claim 4, further including contacting at least one antioxidant with said supercritical fluid, wherein said at least one antioxidant is a tri-substituted phenol substituted in the 2, 4 and 6 positions with one or more of an alkyl, hydroxyalkyl, aryl, alkenyl or a hydroxyalkenyl group having the general formula:

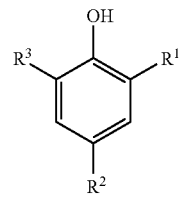

wherein the sum of the carbon atoms present in the substituent groups $R^1$, $R^2$ and $R^3$ is in the range of 3 to about 36.

8. The process of claim 3, wherein said supercritical fluid is carbon dioxide, wherein said polymer is said polyether, said polypropylene, said polyester, or said polyvinyl chloride, and wherein said biodegradable polymer is said biodegradable polyester, or said biodegradable polylactic acid polymer, or said copolymer thereof or a blend thereof.

9. The process of claim 8, further including contacting at least one antioxidant with said supercritical fluid, wherein said at least one antioxidant is a tri-substituted phenol substituted in the 2, 4 and 6 positions with one or more of an alkyl, hydroxyalkyl, aryl, alkenyl or a hydroxyalkenyl group having the general formula:

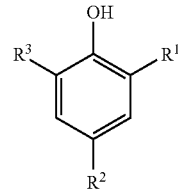

wherein the sum of the carbon atoms present in the substituent groups $R^1$, $R^2$ and $R^3$ is in the range of 3 to about 18.

10. The process of claim 4, wherein said polymer material is a pre-formed polymer article.

11. A process for infusing at least one corrosion inhibitor into a biodegradable polymer, a polymer or a resin material comprising the steps of:
   preparing a supercritical fluid or supercritical fluid system that contains at least two fluid components, comprising carbon dioxide or nitrous oxide as one of the at least two fluid components or both carbon dioxide and nitrous oxide as two of the at least two fluid components;

simultaneously contacting with said supercritical fluid or supercritical fluid system a) at least one triazole or inorganic nitrite corrosion inhibitor, and b) at least one said biodegradable polymer, said at least one polymer, or at least one said resin material at supercritical conditions, and infusing said at least one triazole or inorganic nitrite corrosion inhibitor into said biodegradable polymer, said polymer, or said resin material; and separating at least essentially all of the supercritical fluid or supercritical fluid system from said biodegradable polymer, said polymer, or said resin material leaving said at least one triazole or inorganic nitrite corrosion inhibitor infused in said biodegradable polymer, said polymer, or said resin material.

12. The process of claim 11, wherein said corrosion inhibitor is benzotriazole, tolyltriazole, sodium tolyltriazole, or mixtures thereof.

13. The process of claim 11, wherein said inorganic nitrite is a Group 1 nitrite a Group 2 nitrite, or mixtures of two or more thereof.

14. The process of claim 13, wherein said polymer or resin material comprises natural rubber, polyisoprene, styrene-butadiene polymer, butyl rubber, chloroprene polymer, polyamide, polyimide, polyester, nitrile rubber, polyacrylic, polystyrene, fluoro polymer, vinyl chloride polymer, polycarbonate, polyurethane, polyacetylene, or polyolefin, or combinations thereof, wherein said biodegradable polymer comprises a biodegradable polymer precursor or resin, a biodegradable polyester, a biodegradable polylactic acid polymer, a biodegradable polyester amide polymer, or a biodegradable polyester urethane polymer, or a copolymer of any two or more of said biodegradable polymers.

15. The process of claim 14, wherein said corrosion inhibitor is said inorganic nitrite, wherein said nitrite is sodium nitrite, potassium nitrite, or barium nitrite, or mixtures of two or more thereof, and wherein said polymer is said polyether, said polypropylene, said polyester, or said polyvinyl chloride, and wherein said biodegradable polymer is said biodegradable polyester, or said biodegradable polylactic acid polymer, or said copolymer thereof or a blend thereof.

16. The process of claim 11, further including contacting at least one additional additive with said supercritical fluid, said additive comprising an antioxidant, accelerator, accelerator activator, plasticizer, softener, vulcanizing agent, extender, tackifier, monomer, polymerization initiator, UV stabilizer, UV sensitizer, dye, filler, slip agent, lubricant, anti-bacterial, anti-static, anti-mildew agent, anti-settling agent, insecticide, pesticide, corrosion inhibitor, oil, or mixtures of two or more thereof, and wherein said polymer or resin material comprises natural rubber, polyisoprene, styrene-butadiene polymer, butyl rubber, chloroprene polymer, polyamide, polyimide, polyester, nitrile rubber, polyacrylic, polystyrene, fluoro polymer, vinyl chloride polymer, polycarbonate, polyurethane, polyacetylene, or polyolefin, or combinations thereof, and wherein said biodegradable polymer comprises a biodegradable polyester, a biodegradable polylactic acid polymer, a biodegradable polyester amide polymer, or a biodegradable polyester urethane polymer, or a copolymer of any two or more of the biodegradable polymers.

17. The process of claim 11, further including contacting at least one additional additive with said supercritical fluid, said additive comprising at least one antioxidant, said antioxidant being infused into the polymer or resin material.

18. The process of claim 14, further including contacting at least one additional additive with said supercritical fluid, said additive comprising an antioxidant, wherein said at least one antioxidant is a tri-substituted phenol substituted in the 2, 4 and 6 positions with one or more of an alkyl, hydroxyalkyl, aryl, alkenyl or a hydroxyalkenyl group having the general formula:

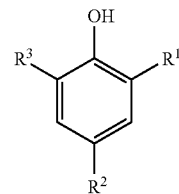

wherein the sum of the carbon atoms present in the substituent groups $R^1$, $R^2$ and $R^3$ is in the range of 3 to about 36.

19. The process of claim 16, wherein said at least one additional additive is said antioxidant, wherein said at least one antioxidant is a tri-substituted phenol substituted in the 2, 4 and 6 positions with one or more of an alkyl, hydroxyalkyl, aryl, alkenyl or a hydroxyalkenyl group having the general formula:

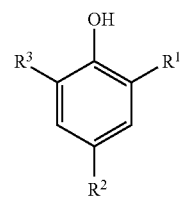

wherein the sum of the carbon atoms present in the substituent groups $R^1$, $R^2$ and $R^3$ is in the range of 3 to about 18.

20. The process of claim 11, wherein said supercritical fluid is a binary or ternary supercritical fluid system.

21. The process of claim 14, wherein said polymer material is a pre-formed polymer article.

22. The process of claim 4, wherein said corrosion inhibitor is contacted with said supercritical fluid after said biodegradable polymer, said polymer, or said resin is contacted with said supercritical fluid.

* * * * *